United States Patent [19]
Joshi et al.

[11] Patent Number: 5,199,866
[45] Date of Patent: Apr. 6, 1993

[54] ADJUSTABLE MOMENTUM SELF-COOLED OXY/FUEL BURNER FOR HEATING IN HIGH TEMPERATURE ENVIRONMENTS

[75] Inventors: Mahendra L. Joshi, Altamonte Springs; James K. Nabors, Apopka, both of Fla.; Aleksandar G. Slavejkov, Allentown, Pa.

[73] Assignees: Air Products and Chemicals, Inc., Allentown, Pa.; Combustion TEC, Inc., Orlando, Fla.

[21] Appl. No.: 860,651

[22] Filed: Mar. 30, 1992

[51] Int. Cl.⁵ ............................................. F23C 7/00
[52] U.S. Cl. ................................... 431/353; 431/187; 239/417; 239/417.3; 239/424; 239/416
[58] Field of Search .............. 431/186, 187, 189, 353; 239/416.5, 417, 417.3, 420, 424, 416

[56] References Cited

U.S. PATENT DOCUMENTS

| | | | |
|---|---|---|---|
| 368,266 | 8/1887 | Wright | 239/416 |
| 1,779,647 | 10/1930 | Van Brunt | 431/186 |
| 4,378,205 | 3/1983 | Anderson | 431/5 |
| 4,541,796 | 9/1985 | Anderson | 431/187 |
| 4,690,635 | 9/1987 | Coppin | 431/187 |
| 4,797,087 | 1/1989 | Getman | 431/10 |

FOREIGN PATENT DOCUMENTS 384760 11/1923 Fed. Rep. of Germany ...... 431/186

*Primary Examiner*—Carroll B. Dority
*Attorney, Agent, or Firm*—James C. Simmons

[57] ABSTRACT

An oxy-fuel system for reducing $NO_x$ formation in corrosive high temperature environments including a self-cooled adjustable oxy-fuel burner that generally produces a luminous flame having a concentric fuel rich phase and an outer surrounding oxidizer rich phase the flame directed through a precombustor mounted on the flame end of the burner the precombustor having a length to diameter (L/d) ratio fixed by the firing rate of the burner.

5 Claims, 5 Drawing Sheets

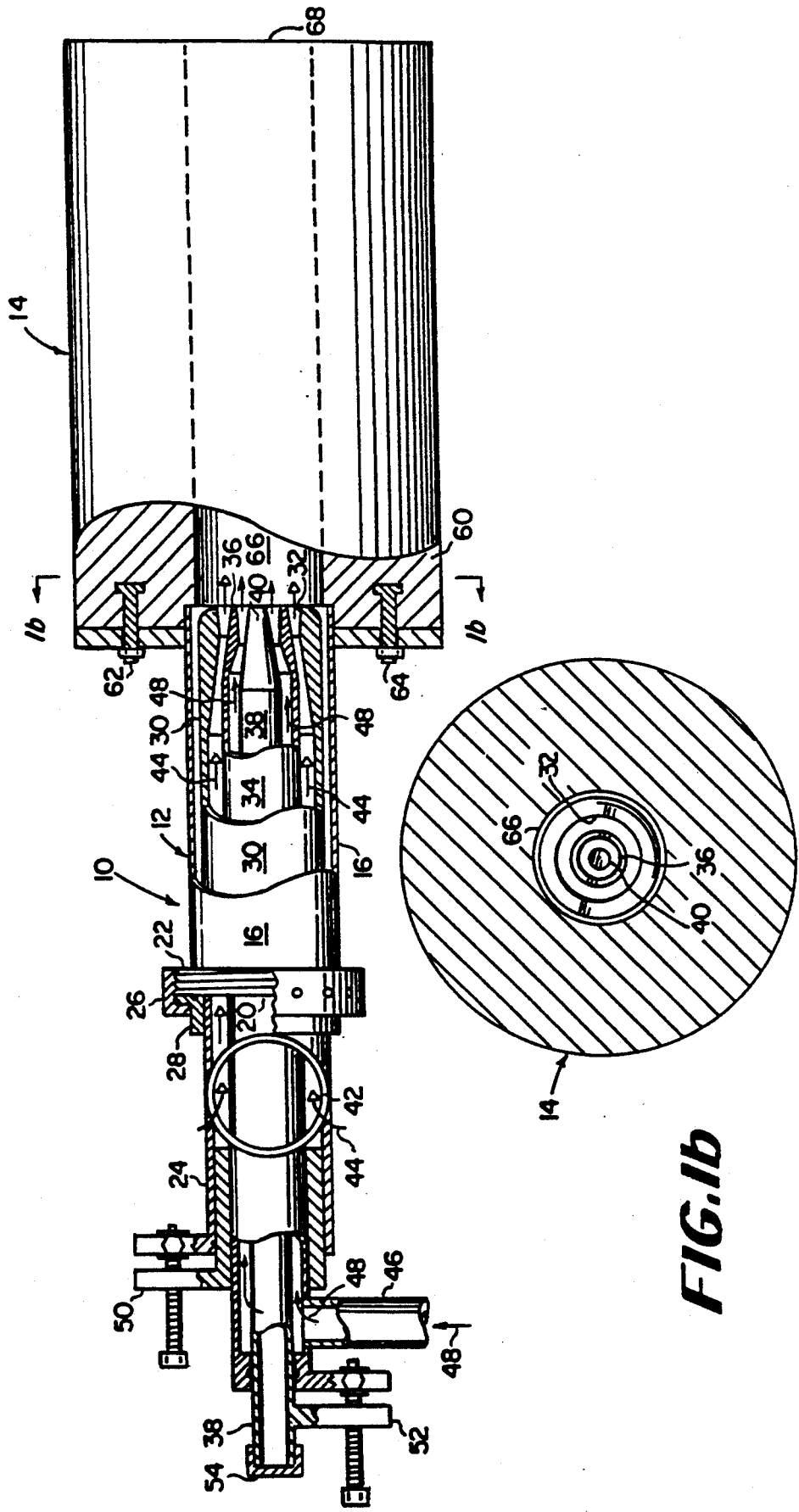

ADJUSTABLE MOMENTUM SELF-COOLED OXY/FUEL BURNER FOR HEATING IN HIGH TEMPERATURE ENVIRONMENTS

FIELD OF THE INVENTION

The present invention pertains to oxygen-fuel heating apparatus used for producing elevated temperatures in industrial melting furnaces for such diverse products as metals, glass, ceramic materials and the like.

BACKGROUND OF THE INVENTION

In completely or partially combustion heated high-temperature furnaces such as a glass melting furnace, pollution is a frequently encountered problem. High emission levels of pollutants such as oxides of nitrogen ($NO_x$), sulfur dioxide ($SO_2$), carbon dioxide, and particulates, which often exceed the maximum levels permitted by the Environmental Protection Agency Regulations are typical for furnaces with air-fuel fired and oxygen enriched air-fuel fired burners.

In the past, the problem has been addressed by using post-combustion pollutant reduction techniques. However, these processes require equipment that makes the solution extremely capital intensive and costly to operate. Another and more efficient method is using oxygen in the combustion process to eliminate nitrogen from the air and reduce the $NO_x$ and particulate emissions to below the guidelines suggested by the Environmental Protection Agency. In addition, the use of oxygen in combustion reduces carbon dioxide emission through an increase in heating efficiency of the furnace and brings numerous other benefits ranging from increased production capacity to savings in batch chemicals.

Oxygen-fuel burners may be divided into two major groups, those that are water cooled and those that are gas cooled. A frequently encountered problem with the burners of either group is the lack of a diluent and carrier gas; e.g., nitrogen, which increases partial pressures of volatile batch components and accelerates corrosion rates of metallic and ceramic materials used for burner construction. Thus, build-up and corrosion on water or gas cooled burner nozzles are the most common problems in high temperature furnaces. A large temperature difference between the cooled burner nozzles and furnace gases causes condensation of volatile and corrosive species and build-up on the burner nozzle. This is reported in an article entitled "Oxygen Firing at Parkersburg" by D. Shamp and D. Davis in the December 1990 edition of American Glass Review. In a gas cooled or water cooled burner where the water cooling is not at optimum flow rates, build-up on the nozzles can cause flame deflection and impingement on the burner nozzle leading to damage or destruction of the burner.

A second problem encountered with water and gas cooled oxy-fuel burners is the fact that the refractory burner block, often used to enable installation of the burner into a furnace and/or to increase flame stability, involves an opening with an inner diameter much larger than the flame jet diameter causing entrainment of corrosive furnace gases or particulate material inside the block and contact with the burner. This type of burner is shown in U.S. Pat. No. 4,690,635.

Another problem, to both the water and gas cooled burners is low flame luminosity because of a high burning velocity and rapid mixing rates encountered in such combustion systems. This decreases the heating efficiency since radiation is the major heat transfer mechanism in a high temperature furnace such as a glass melting furnace.

In addition, water cooled oxy-fuel burners require capital investment and maintenance. Such burners may lower the overall heating efficiency of a furnace by extracting considerable heat from it with the flow of cooling water. For example, for a burner cooling water flow rate of 5 gallons per minute, and output to input water temperature difference of 50° F., heat loss per burner is approximately 125,000 Btu's per hour. For a 10-burner furnace the heat loss due to the water-cooling amounts to about $30,000 per year. In addition, there is always the possibility of water leakage into the furnace if a burner is not maintained properly and there is a risk of clogging and corrosion of the burner water cooling channels if poor water quality is the only means of cooling available to the user.

Gas-cooled oxy-fuel burners can present a problem in the case of interruption in the fuel or oxygen supply. Such burners have to be immediately removed from the firing port in the furnace to prevent possible damage from the high temperature present in the furnace. If such burners rely upon metal fins at the burner face to cool the burner, these fins can collect condensation and result in corrosion problems with the burner.

SUMMARY OF THE INVENTION

The present invention pertains to an adjustable oxy-fuel combustion (heating) system used to produce high temperatures for production furnaces such as a glass melting furnace. The burner creates a flame by shielding a fuel rich oxy-fuel phase or mixture inside of a sheath of a fuel lean or oxygen-rich oxy-fuel phase or mixture and confining the shielding of the flame along a predetermined path having a predetermined cross-section to achieve the results of two phase turbulent diffusion flame having low flame temperature due to slow mixing characteristics of oxygen and fuel streams in a precombustor so that aspiration of corrosive species is prevented and generation of $NO_x$ is reduced.

BRIEF DESCRIPTION OF THE DRAWING

FIG. 1a is a front elevational view of the system according to the present invention partially in section and partially fragmented to show details of construction.

FIG. 1b is a section taken along line 1b—1b of FIG. 1a.

DETAILED DESCRIPTION OF THE INVENTION

Figure 2B:
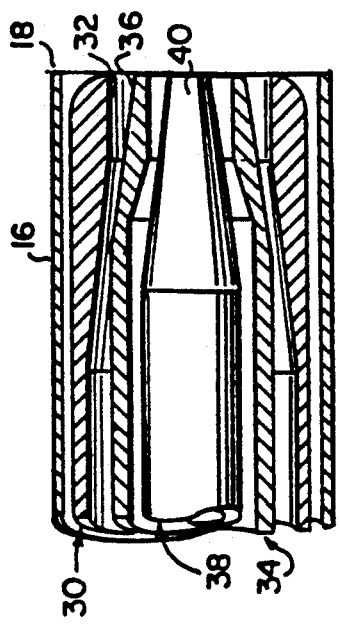
FIGS. 2a, 2b, 2c and 2d are fragmentary views of the front end of the burner portion of the system illustrating the means for adjusting the area of the outlet of oxidant and gas flow passages.

As set forth above, prior art oxy-fuel burners have been used to heat industrial furnaces with a view toward overcoming problems with conventional air-fuel burners. In the context of this invention, the term "oxy" or "oxygen" is taken to mean any gaseous oxidizer having more than 30% oxygen. In other words, in the context of the present invention, oxy or oxy-fuel includes all oxidizers except air. Furthermore, in the context of the present invention, fuels are taken to mean the normally gaseous fuels including, but not limited to, methane, natural gas, propane, hydrogen sulfide and the like, as well as liquid fuels, such as fuel oils, heating oils, waste oils, slurries and the like, to name but a few.

A frequently encountered problem with completely or partially combustion-heated high temperature furnaces, such as glass melters, is the need for an adjustable oxy-fuel flame with varying characteristics depending upon a given firing rate. Depending upon the furnace design, combustion volume, firing rate, load type, load distribution and burner location, the oxy-fuel flame adjustability in length, shape, luminosity and momentum is essential for an efficient furnace operation. An operator having the ability to adjust all of the foregoing conditions would have the benefit of, not only improving furnace thermal efficiency, but also increasing both quality and productivity of the furnace throughput. Furthermore, adjustability and flame gas momentum would prevent undesirable flame impingement onto the refractory of the furnace, excessive particulate entrainment by the flue, and formation of pollutants such as NOx, which often exceed the maximum Environmental Protection Agency permitted levels.

In the past, momentum control was generally achieved by simple, but mostly impractical methods. The first was to use a series of replaceable fixed area nozzle tips which were changed depending upon the need for increase or decrease in momentum. In order to do this, nozzles of appropriate diameter or flow area were made to be interchangeable on the flame end of the burner.

Another technique was used which encompassed changing the upstream pressure of the flow to the burner. Using a limiting orifice valve, butterfly or globe valve, created a simple pressure drop across the valve. Based upon a given valve opening, there would be a change in the upstream pressure to the burner which would generally result in a change in momentum. However, this method would also change the total flow rate which in all cases may not be desirable from a firing rate consideration. This method had further drawback in that it can only be used for small incremental changes in flame characteristics.

It was also found that in certain cases a pipe-size selection could be available, which selection would be dependent upon the firing rate. Larger size pipes would be selected for the higher firing rates and similar, smaller size pipes for the lower firing rates when assembling the burner.

The foregoing methods were found to be inefficient and time-consuming requiring process interruption during the changeover of nozzles and pipe sizes depending upon the desired firing rate or flame characteristics. Furthermore, these systems and methods are highly impractical in high temperature, continuous furnaces operating under oxy-fuel combustion for heating, since the whole burner has to be pulled out of the furnace after shutting down the flow of gas and oxygen to replace the nozzle assemblies.

Set forth above is adequate discussion of the two general types of burners used in industrial heating environments; namely, those that are considered water-cooled and those that are considered gas-cooled.

Referring to FIG. 1a and 1b, numeral 10 indicates the oxy-fuel burner system of the present invention. The oxy-fuel burner system includes an oxy-fuel burner 12 and a precombustor 14.

Referring to the burner 12, the burner consists of a first housing section 16 which can be referred to as the forward housing of the burner 12. Section 16 has a forward end 18 referred to as the flame end of the burner 12. Housing 16 has a second end 20 containing a suitable threaded portion 22 proximate thereof in the form of a flange so that the second or housing portion 24 of the burner 12 can be fitted to the forward housing 16. Sections 16 and 24 can be mated together by use of a collar 26 which fits over a flange 28 on section 24, sealing accomplished by means of O-rings and the like (not shown) as is well known in the art.

Disposed within section 16 and concentric thereto is a tubular member 30 which is sometimes referred to as the oxygen conduit. Tubular member or section 30, while being generally cylindrical in shape, has a converging-diverging front section 32, the function of which will be explained hereafter. Disposed within section 30 is a fuel conduit 34 having a generally cylindrical cross-section with a forward converging-diverging nozzle shape or discharge end 36 as will hereinafter be discussed. Disposed within the fuel conduit 34 is a gas cap, or fuel cap, or bluff body 38 having a generally cylindrical section terminating in a forward section in the shape of a truncated cone 40. Sections 16, 30, 34 and 38 having generally circular cross-sections are assembled in concentric fashion along a common longitudinal axis as shown in FIG. 1b.

Housing section 24 includes an oxygen inlet 42 which communicates as shown by arrows 44 with the passage defined between the oxygen conduit 30 and the fuel conduit 34 so that oxygen can be introduced into the burner and exit thereof through the nozzle end 18 of the burner 12. Burner 12 includes in housing section 24 a fuel inlet 46 which permits introduction of fuel as shown by arrows 48 into the portion of the burner between the fuel conduit 34 and the gas cap 38. The burner 12 is assembled, as is well known in the art, so that there is no leakage of fuel and oxygen between the various subassemblies so that the mixing of oxygen and fuel takes place at or near the flame end 18 of the burner. Burner 12 can include suitable adjusting mechanisms 50, 52 so that the fuel conduit 34 and gas cap 38 can be moved longitudinally within the burner 12 as well be hereinafter explained. Conduit 38 is fitted with a fluid-type access cap 54 so that the burner assembly can be used for firing liquid fuels. Mounted on the forward end of the burner 12 juxtaposed to the flame end 18 is a precombustor 14. The precombustor 14 can be fabricated from a refractory or metal, depending on the furnace temperature, and formed to be a stand-alone unit or can be disposed inside of an outer structural shape, if required. The inner structure 60 of precombustor 14 is fixed to flange 56 fixed to the housing 16 of burner 12 by embedded fasteners or fasteners inserted in receiving slots 62, 64 as shown in the drawing and as is well known in the art.

A cylindrical passage 66 which is of a diameter that will be determined in accord with the firing rate of the burner as will be explained hereinafter is formed in precombustor 14. The passage 66 extends for the length of the precombustor 14 to encircle and direct flame issuing from the flame end 18 of burner 12 outwardly of the discharge end 68 of the precombustor 14. Precombustor 14 is mounted to the wall of the furnace or vessel to be heated and can be in the shape of a refractory block used in that vessel or other shape and/or other materials on the outer surface to make it convenient for inserting into the furnace wall.

The geometry of the precombustor 14 is a function of the firing rate as shown in U.S. patent application Ser. No. 07/860,652, filed Mar. 30, 1992. For example, if the burner 12 is capable of firing at a rate of between 0.25 and 40 million Btu per hour, the dimensions of the precombustor 14 should be such that the distance or length from the face or flame end 18 of the burner 12 to the discharge end 68 of the precombustor 14 is between 12 inches and 48 inches, the diameter of the interior cylindrical aperture or passage of the precombustor 14 should be between 2 inches and 8 inches and the ratio of length to diameter (L/d) should be between 2 and 6. In accord with the invention, the preferred precombustor configurations are shown in Table 1 below.

TABLE 1

| Firing Rate Range | Turndown | Length (L) | Diameter (d) | L/d Ratio |
|---|---|---|---|---|
| 0.25–1.5 MM | 6 | 12–18" | 3.0–3.5" | 3.4–5.1 |
| 1.0–3.0 MM | 3 | 12–18" | 3.5–4.0" | 3.0–4.5 |
| 2.0–6.0 MM | 3 | 12–18" | 4.0–4.5" | 2.8–4.0 |
| 4.0–20.0 MM | 5 | 16–48" | 4.0–8.0" | 2.0–6.0 |

The numbers given in the table above are empirical values derived from the measurements of flame luminosity, precombustor temperature profile, and precombustor pressure collected during experimental test firing. These dimensions go against the traditional approaches in designing burners and burner blocks since this "tight" precombustor is actually cooled and shielded by the flowing and reacting gases. As used herein "tight" refers to a small dimensional difference between the inner diameter of passage 66 of its combustor 14 and the flame produced by burner 12. In the prior art, the burner blocks were large to keep them away from the hot oxy/fuel flame which resulted in the entrainment of the furnaces gases.

The precombustor can have a converging or diverging shape to the inner surface 66 at the discharge end 68, provided that the angle of convergence or divergence is no greater than plus or minus 15°, the angle being measured relative to the longitudinal axis of the precombustor 14.

A burner according to the invention provides a basic flow configuration consisting of two co-flowing annular jets. The oxygen is discharged from the forward end of the burner 12 in the form of an annulus through the passage defined between the oxygen conduit 30 and the fuel conduit 34. The fuel exits the flame end 18 of the burner 12 through an annular orifice between the forward end 36 of fuel conduit 34 and the outer surface of gas cap 38. The two annular flow passages are created by assembly of individual conduits with the forward or tip portion of the conduits designed for minimum pressure drop for both oxygen and fuel. In one embodiment, the nozzle is that portion of the oxygen conduit, fuel conduit or gas cap measured from the forward end to a point where the respective section is cylindrical in shape. The various flow dimensions (e.g., geometry in area) are designed based upon experimental knowledge of fuel and oxygen, flow velocities, range of velocity adjustments needed, turbulence level, acceptable in flows, and flame characteristics of the co-flowing oxygen/fuel streams. In particular, the rounding of the forward end of the oxygen conduit with a suitable radius serves two important functions. The first is to facilitate a delayed and gradual mixing of fuel and oxygen streams in the precombustor 14. It has been shown that a "square-edged" (without rounded end) forward end 36 of fuel conduit 34 induces a flow separation effect. Secondly, flow separation creates a low pressure region in the shadow of the forward end 36 edge. In this stagnant region, a localized combustion was found to be taking place which leads to soot deposition and tip overheating. Once the rounded end of the forward end 36 was provided, the flow separation effects were drastically reduced, along with the localized combustion phenomena and temperature of the forward end 36.

Figure 2D:
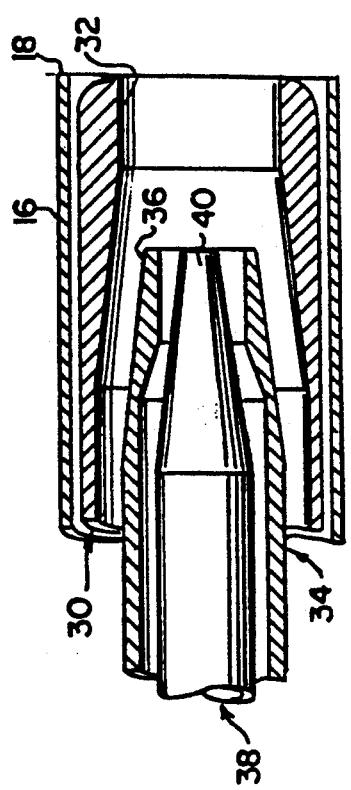
Figure 2A:
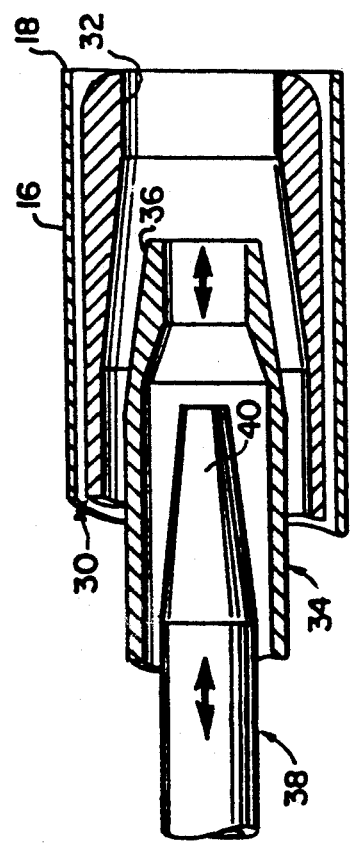
Figure 2C:
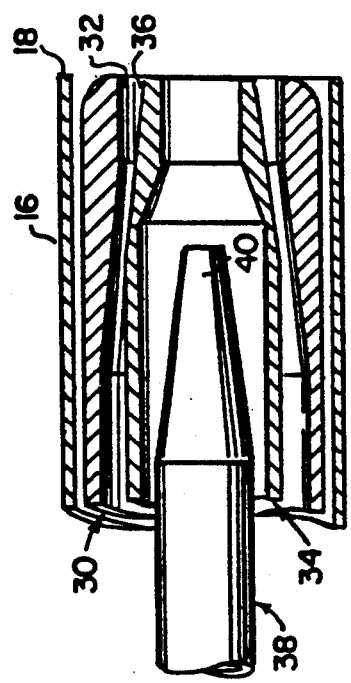

The burner of FIGS. 1a and 1b can be used to change the mixing rate of oxygen and fuel by moving the fuel conduit 34 relative to the oxygen conduit 30 and the fuel conduit 34 and gas cap 38 relative to each other, along an axial direction inwardly of the housing 16 of the burner 12. FIG. 2a shows the positioning of the oxygen conduit 30, fuel conduit 34 and gas cap 38 in what is referred to as position 13 where the gas cap 38 and the truncated cone 40 are retracted to what would be considered the far left position in the plane of the drawing and the orientation of FIGS. 1a and 2b. FIG. 2b shows the position of the oxygen conduit 30, fuel conduit 34 and gas cap 38 to be with the flame end 18 of the burner 12. This is considered to be position 1 for both the oxygen and the fuel whereas, FIG. 2a's position was considered position 13 for both oxygen and fuel. FIG. 2c shows what is considered to be oxygen position 1 and fuel position 13, whereas FIG. 2d shows oxygen position 13 and fuel position 1. From the foregoing it can be seen that oxygen position 1 is that position where the converging-diverging front section 32 for the oxygen conduit 30 and the fuel conduit 34 discharge end 36 are in the same plane. Fuel position 1 is when the discharge end 36 of fuel conduit 34 and the truncated cone 40 of gas cap 38 are in the same plane. Conversely, position 13 for either oxygen or fuel is when the complementary parts are at the fully retracted or left-hand position as shown in the drawing. The retraction process for the various burner parts is done manually with the help of individual adjustment mechanisms (50, 52). By retraction one can vary the actual flow area at the flame end 18 for the fuel and oxygen.

There is almost a linear behavior between both fuel and oxygen flow areas at the flame end 18 with the various position settings. Thus, there can be approximately three times the increase in flow area at position 13 for both the fuel and oxygen compared with the corresponding flow areas at position 1. This means that the velocity can be varied approximately 300% for both fuel and oxygen at a given firing rate (or a given flow rate).

Figure 3:
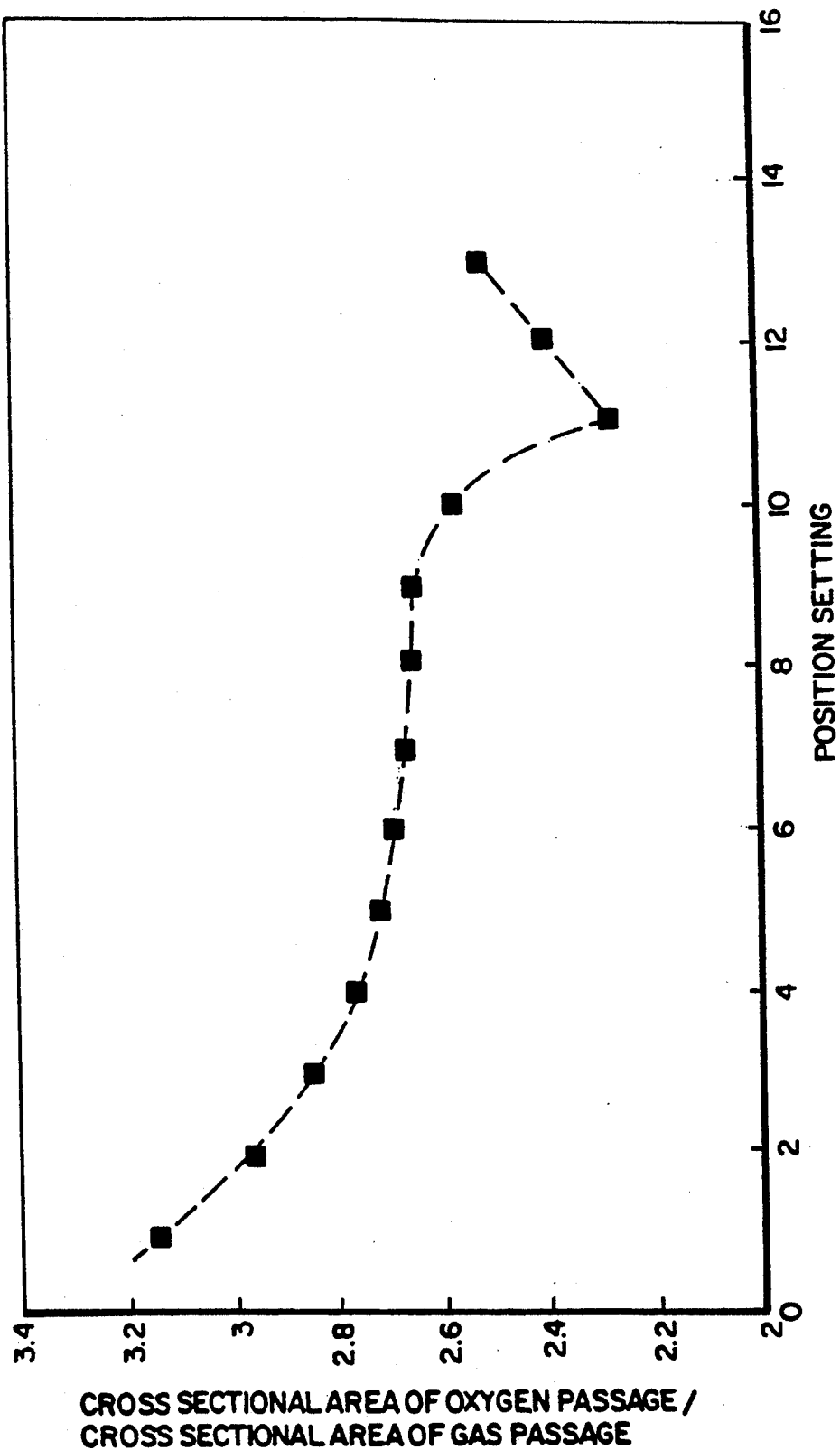
FIG. 3 is a plot of position setting against the ratio of the cross-sectional area of the oxygen passage to the cross-sectional area of the gas passage for the burner of FIG. 1.

FIG. 3 is a plot showing the ratio of oxygen flow area to fuel flow area as a function of position settings. The curve shows an exponential decay from position 1 to position 10. At position 10, the fuel flow area opens up to the maximum value whereas the oxygen flow area increases all the way to position 13 as shown in FIG. 3. A dip in the curve is seen at position 11 due to the foregoing reasons. Total axial movement of both adjusting mechanisms is approximately 1.625 in. The nozzles described above are designed to operate within the parameters of the precombustor 14 discussed above.

A burner according to the present invention enables velocity variations for both a gaseous fuel such as natural gas ($V_{ng}$) and oxygen ($V_{ox}$). Depending upon the flow rate, the position settings 1 through 13 can give high momentum to low momentum choices for flame control. In high temperature furnace (e.g. glass melters), for the high flame luminosity and longer flames (preferred operation) low velocities (higher position settings) should be used. In other words, $V_{ng}$ and $V_{ox}$ should be less than 600 feet per second, and $V_{ng}/V_{ox}$ should be between 0.3 and 6.0. However, for the high flame luminosity (preferred operation) when using the burner of the present invention, lower velocities should be used with the $V_{ng}/V_{ox}$ ratio being between 1.0 and 1.5.

Figure 4B:
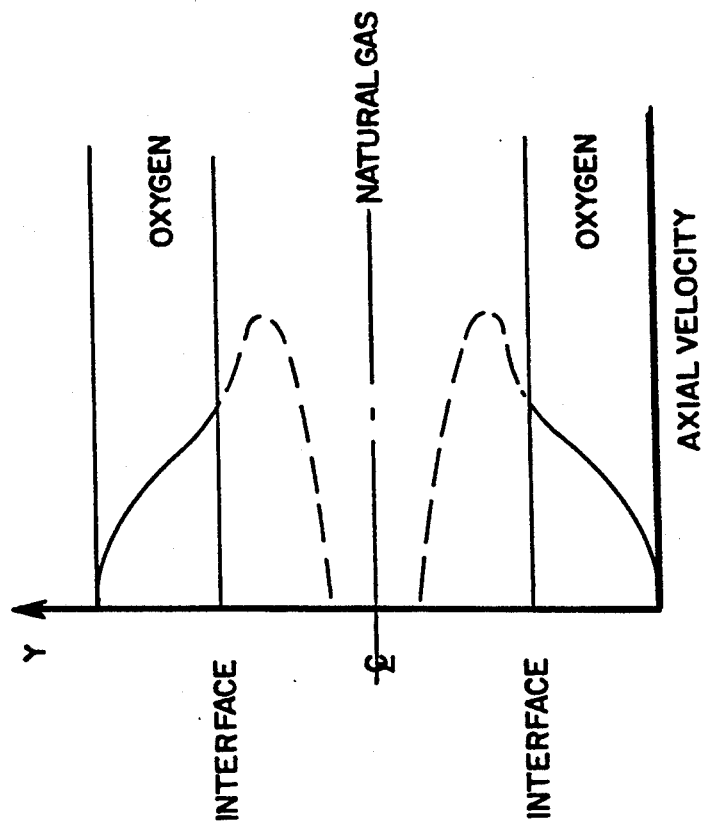
FIGS. 4a and 4b are plots of axial velocity against the position inside of the precombustor from the centerline to the interior wall of the precombustor for extreme position settings for the burner.
Figure 4A:
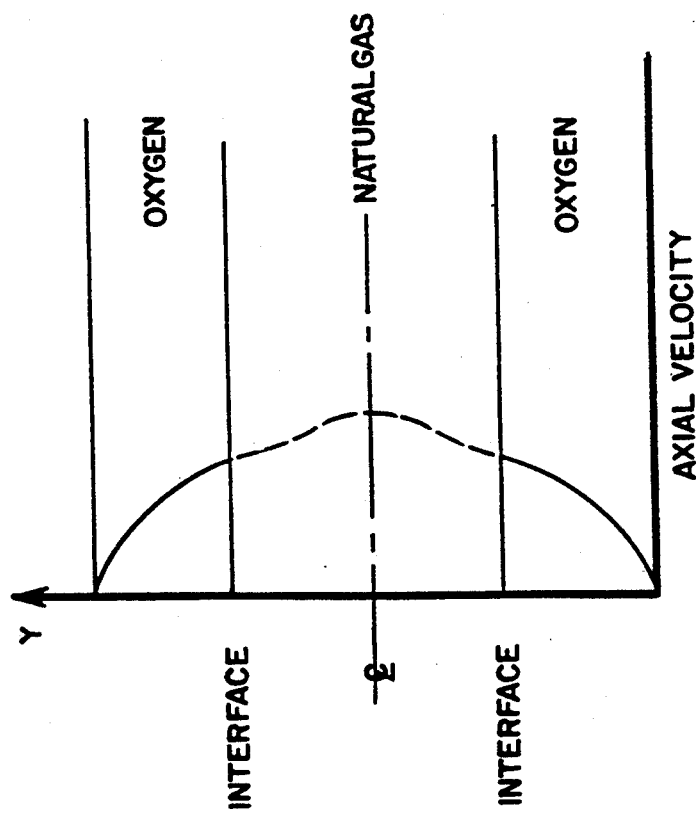
Figure 4D:
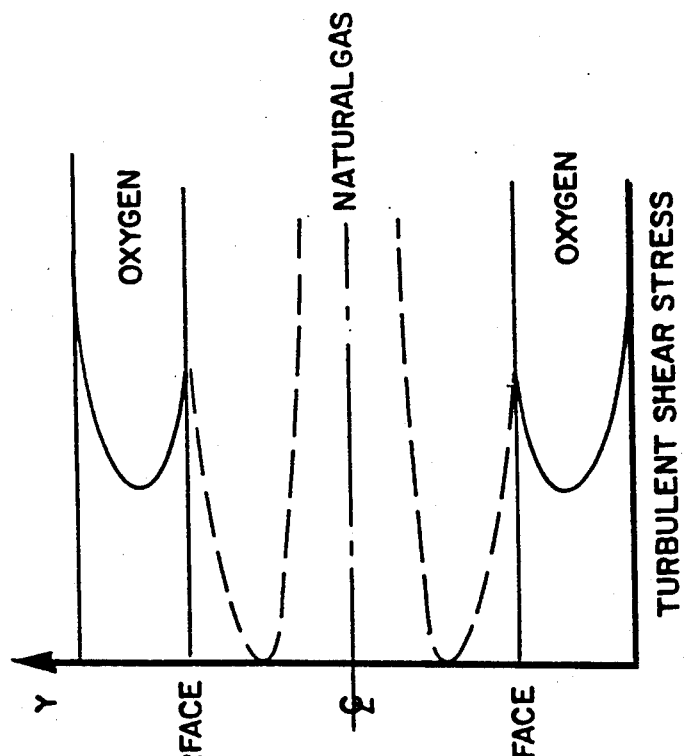
FIGS. 4c and 4d are plots of turbulent shear stress against interface position for the burner positions of FIGS. 4a and 4b, respectively.
Figure 4C:
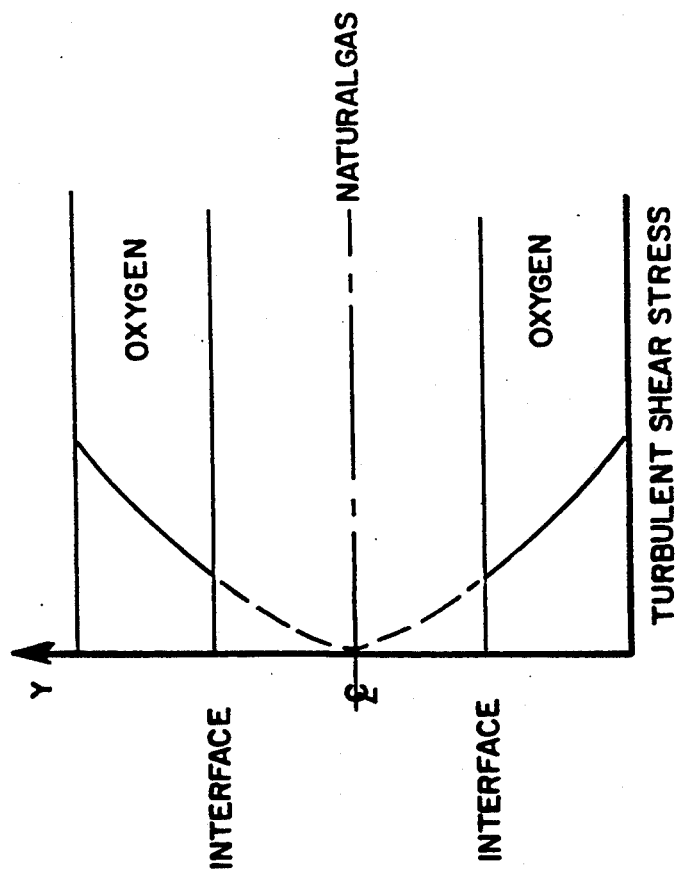

Oxy-fuel flame characteristics are influenced by many geometrical and fluid parameters. The axial velocity and turbulent shear stress profiles of both oxygen and a gaseous fuel, e.g. natural gas, at the flame end 18 are shown in FIGS. 4a through 4d. The two extreme position settings are considered positions 1 and 13 which are used to illustrate the changes. As shown in FIGS. 4b and 4d the interfacial velocities and turbulent shear stress are at maximum. On the other hand at position 13 (FIGS. 4a and 4c) the interfacial velocities and turbulent shear stress are at minimum. The effects of turbulent shear stresses at the wall and fuel-oxygen interface is to introduce turbulent fluctuations (turbulent intensity) in both fuel and oxygen flows. The higher the turbulence intensity the higher would be the mixing rate of the fuel-oxygen interface. This higher mixing rate of fuel and oxygen will accelerate the combustion process occurring in precombustor 14 and inside the furnace. Table 2 illustrates the effect of burner position settings 1 and 13 on various fluid parameters which subsequently changes the flame characteristics.

air-fuel burners, the former would need to operate in a high momentum regime to maximize the effects of the air-fuel burners and large gas volumes on the oxy-fuel flame shape and stability. However, in a full conversion oxy-fuel furnace, low-momentum is preferable since it offers lower flame temperatures and higher flame luminosity.

Manufacturing of the burner so that the assembly has a positive seal is required to minimize external air infiltration. Since the parts are made to be fluid tight, ambient or cold air surrounding the burner cannot inspirate into the furnace interior, thus reducing the amount of external heat needed which can result in a fuel savings. Additionally, the sealed firing prevents air inspiration into the burners combustion assembly minimizing any external source of air leaking into the furnace and thus reducing a major source of nitrogen available for NOX formation.

The burner of the present invention is normally subjected to a high radiation environment such as a glass melting furnace. In such a furnace the front end of the burner is normally exposed to an 2,600° F. on a continuous basis. No common alloys will survive this temperature without some form of external or internal cooling. However, the burner of the present invention operates on two modes of cooling during normal operation, the first being force convective cooling by fuel and/or oxygen flowing through the burner and the second by a conduction and free convection cooling by the burner body. A length of at least 21 inches and approximate surface area of 230 in.$^2$ was adequate to dissipate heat to the surroundings by conduction and free convection.

A burner according to the present invention was adapted for oxy-oil combustion and tests run at a commercial fiberglass manufacturing facility. The burner of the present invention was installed into a furnace normally heated with 8 oxygen-natural gas burners. One of the conventional oxy-natural gas burners was replaced with the burner according to the invention which was fired using both #2 and #6 fuel oils. The firing rate on the burner varied between 5 and 18 gallons per hour (7 gallons produces approximately 1 million Btu) with the

TABLE 2

EFFECTS OF BURNER NOZZLE POSITION SETTINGS ON FLUID PARAMETERS AND FLAME CHARACTERISTICS

| Change to Burner Position Settings | Nat. Gas & $O_2$ Flow Area | Nat. Gas & $O_2$ Interface Velocities | Nat. Gas & $O_2$ Wall + Interface Shear Stress | Nat. Gas & $O_2$ Turbulence Intensity | Nat. Gas & $O_2$ Mixing Rate | Flame Luminosity | Flame Temperature | Flame Length |
|---|---|---|---|---|---|---|---|---|
| Oxygen: Pos. 1 and Nat. Gas: Pos. 1 | ↓ | ↑ | ↑ | ↑ | ↑ | ↓ | ↑ | ↓ |
| Oxygen: Pos. 13 and Nat. Gas: Pos. 13 | ↑ | ↓ | ↓ | ↓ | ↓ | ↑ | ↓ | ↑ |

↑ - increasing trend
↓ - decreasing trend

The most influencing parameters are the turbulence intensity and mixing rates. These two parameters play an important role in changing the flame, temperature, length and its luminosity. Lower position settings (e.g., 1, 2, 3) give high momentum short flame characteristics whereas the higher position settings (e.g., 7, 8, 9) give a low momentum long flame characteristic. For example, in a partial conversion furnace with both oxy-fuel and average of 12 gallons per hour being consumed during the test. The flame on the burner was found to be very luminous with the length varying from 1 to 5 feed depending upon the firing rate. Temperature of the surrounding furnace refractories increased by an average of 50° F. due to the very luminous oxy-oil flame. Temperature of the precombustor was found to be similar to the furnace temperature even though the flame had been very intense inside the precombustor. Lastly, the inspection of the burner assembly at the end of the test revealed no deposition or metal discoloration due to the high temperature of the glass melting furnace or combustion process.

Having thus described our invention what is desired to be secured by letters patent of the United States is set forth in the appended claims.

We claim:

1. An oxy-fuel combustion system comprising in combination:

an oxy-fuel burner having a generally cylindrical housing with a fuel conduit disposed in spaced relation to and concentrically within said housing; said fuel conduit being co-extensive along a major portion of said housing and having a flame end having a converging-diverging nozzle terminating in a same plane as the flame end of said housing; a fuel cap having a generally cylindrical cross-section terminating in a forward section in the shape of a truncated cone disposed concentrically within said fuel conduit, said fuel cap and said fuel conduit cooperating to produce an annular fuel flow at said flame end of said housing; an oxidizer conduit having a converging-diverging front section disposed concentrically within said housing between said fuel conduit and said housing, said oxidizer conduit extending coexistively in said housing; said fuel conduit adapted for variable positioning relative to said oxidizer conduit by sliding said fuel conduit relative to said oxidizer conduit along the longitudinal axis including a position where they terminate in the plane defined by the flame end of said housing to define an annular oxidizer passage orifice surrounding said fuel conduit; said fuel conduit and said fuel cap adapted for variable positioning relative to each other by sliding said fuel conduit relative to said oxidizer conduit along the longitudinal axis including a position where they terminate in the plane defined by the flame end of said housing to define an annular fuel passage means to introduce fuel to said fuel passage and oxidizer to said oxidizing passage; and a precombustor mounted on said burner, said precombustor having a generally cylindrical central passage one end of which is in fluid tight relation to the flame end of said burner and a second end adapted to direct said flame for heating in industrial environments, the longitudinal axis of the cylinder being an extension of the longitudinal axis of said housing of said burner; said combustor so constructed and arrange that said passage has a length to diameter (L/d) ratio of between 2.0 and 6.0 where said burner is used to propagate a flame at firing rates of between 0.25 and 40.0 million Btu/hr.

2. A system according to claim 1 wherein said precombustor is fabricated from a refractory material with an outside shape adapted for replacing a portion of the refractory in the wall of the vessel for which it is intended to be used.

3. A system according to claim 1 wherein said oxy-fuel burner is fabricated from a material selected from the group of stainless steel, alloy steels, high temperature alloys and super alloys or combinations thereof.

4. A system according to claim 1 wherein said precombustor is removably attached to said oxy-fuel burner by means of fasteners and a flange mounted on the flame end of said burner.

5. A system according to claim 1 wherein said oxy-fuel burner is fabricated in removable sections including a two piece housing, removable oxidizer conduit, fuel conduit and fuel cap for servicing.

* * * * *